United States Patent
Byun et al.

(10) Patent No.: US 10,046,740 B2
(45) Date of Patent: Aug. 14, 2018

(54) WIPER CONTROL SYSTEM AND METHOD

(71) Applicant: Hyundai Motor Company, Seoul (KR)

(72) Inventors: Seok Ju Byun, Gyeonggi-do (KR);
Sang Ryoon Son, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/354,991

(22) Filed: Nov. 17, 2016

(65) Prior Publication Data

US 2017/0297533 A1    Oct. 19, 2017

(30) Foreign Application Priority Data

Apr. 15, 2016    (KR) .......................... 10-2016-0046393

(51) Int. Cl.
*B60S 1/08*        (2006.01)
*B60S 1/48*        (2006.01)

(52) U.S. Cl.
CPC .............. *B60S 1/482* (2013.01); *B60S 1/08* (2013.01)

(58) Field of Classification Search
CPC ............................ B60S 1/08; B60S 1/0896
USPC .......................................................... 701/49
See application file for complete search history.

(56) References Cited

U.S. PATENT DOCUMENTS

| 3,581,178 A | * | 5/1971 | Kearns | B60S 1/0807 |
| | | | | 318/443 |
| 3,728,603 A | * | 4/1973 | Kearns | B60S 1/0807 |
| | | | | 15/250.12 |
| 3,796,936 A | * | 3/1974 | Kearns | B60S 1/0807 |
| | | | | 318/443 |
| 4,703,237 A | * | 10/1987 | Hochstein | B60S 1/0818 |
| | | | | 15/DIG. 15 |
| 4,907,475 A | * | 3/1990 | Holbrook | F16H 61/0206 |
| | | | | 475/123 |
| 5,216,340 A | * | 6/1993 | Welch | B60S 1/0814 |
| | | | | 318/41 |
| 5,306,991 A | * | 4/1994 | Suzuki | B60S 1/20 |
| | | | | 318/379 |
| 5,568,026 A | * | 10/1996 | Welch | B60S 1/0814 |
| | | | | 318/41 |
| 5,819,360 A | * | 10/1998 | Fujii | B60S 1/482 |
| | | | | 15/250.04 |
| 6,335,601 B1 | * | 1/2002 | Kato | B60S 1/08 |
| | | | | 318/256 |

(Continued)

FOREIGN PATENT DOCUMENTS

| JP | 58-39549 A | 3/1983 |
| JP | H07-215173 A | 8/1995 |

(Continued)

*Primary Examiner* — Atul Trivedi
(74) *Attorney, Agent, or Firm* — Mintz Levin Cohn Ferris Glovsky and Popeo, P.C.; Peter F. Corless

(57) ABSTRACT

A wiper control system includes: a multifunction switch detecting and transmitting an operation of a wiper provided on a vehicle; a body control module controlling a wiper relay through a data signal of the multifunction switch; and a wiper motor connected to the multifunction switch and the body control module and connected to the wiper to rotate the wiper according to rotation of a cam plate of the multifunction switch and detect a parking end of the body control module, thereby preventing the wiper from being positioned in a middle of a windshield glass.

10 Claims, 5 Drawing Sheets

(56) References Cited

U.S. PATENT DOCUMENTS

| | | | | |
|---|---|---|---|---|
| 2002/0033685 | A1* | 3/2002 | Yabe | B60S 1/08 |
| | | | | 318/443 |
| 2008/0061722 | A1* | 3/2008 | Hasenberg | B60S 1/0807 |
| | | | | 318/443 |
| 2010/0037416 | A1* | 2/2010 | Amagasa | B60S 1/08 |
| | | | | 15/250.31 |
| 2013/0081221 | A1* | 4/2013 | Amagasa | B60S 1/08 |
| | | | | 15/250.01 |
| 2014/0299155 | A1* | 10/2014 | Nelson | B60S 1/08 |
| | | | | 134/6 |
| 2015/0375714 | A1* | 12/2015 | Umeno | B60S 1/0896 |
| | | | | 15/250.12 |
| 2016/0031419 | A1* | 2/2016 | Nelson | B60S 1/3801 |
| | | | | 134/6 |
| 2016/0250998 | A1* | 9/2016 | De Vries | B60S 1/0818 |
| | | | | 701/19 |
| 2016/0339876 | A1* | 11/2016 | Aramaki | B60S 1/50 |
| 2016/0347287 | A1* | 12/2016 | Tousignant | B60S 1/483 |
| 2017/0001602 | A1* | 1/2017 | Oka | B60S 1/482 |

FOREIGN PATENT DOCUMENTS

| | | | | |
|---|---|---|---|---|
| JP | 2009-107421 | A | 5/2009 | |
| JP | 5683700 | B2 | 3/2015 | |
| KR | 20-0144426 | Y1 | 6/1999 | |
| KR | 10-0376836 | B1 | 3/2003 | |
| KR | 10-0764496 | B1 | 10/2007 | |
| KR | 2013-0055081 | A | 5/2013 | |
| KR | 101490952 | B1 * | 2/2015 | B60S 1/08 |

* cited by examiner

WIPER CONTROL SYSTEM AND METHOD

CROSS-REFERENCE TO RELATED APPLICATION

This application claims under 35 U.S.C. § 119(a) the benefit of Korean Patent Application No. 10-2016-0046393, filed on Apr. 15, 2016 in the Korean Intellectual Property Office, the entire contents of which are incorporated by reference herein.

BACKGROUND

(a) Technical Field

The present disclosure relates to a wiper control system and method, and more particularly, to a wiper control system and method for preventing a wiper provided on a vehicle from being positioned in a middle of a windshield glass after operation.

(b) Description of the Related Art

In general, one of the most important requirements for safe driving of a vehicle is to secure a driver's clear view.

To this end, vehicles are commonly equipped with wipers for removing debris and other foreign materials attached to a surface of windshield glass and wiping rain from the surface of the windshield glass.

A conventional wiper device has a structure in which rotary motion generated by a wiper motor is transmitted to a pivot mechanism and a wiper arm through a wiper linkage system, and the wiper arm reciprocates from side to side to thereby allow a blade assembly to move in a predetermined wiping area and clean the windshield glass.

In order to remove water, debris, or other foreign materials from the windshield glass, the wiper cleans the windshield glass using power of the vehicle to thereby secure a driver's view. A known wiper system enables a wiping operation while spraying washer fluid.

Therefore, the wiper is capable of removing debris and other foreign materials from the windshield glass of the vehicle. In order to operate at predetermined rates, the wiper system is provided with a high speed mode and a low speed mode and selects respective switch contact points such that it cleans the windshield glass while the wiper arm is reciprocating from side to side within a predetermined angle at constant rate.

Meanwhile, it is important to control the wiper in the original position by preventing the wiper from blocking the windshield glass when the wiper is stopped after operation.

However, a conventional wiper with an automatic-stop mechanism may intermittently be stopped in the middle of the windshield glass during the spraying of mist or washer fluid, thereby blocking a driver's view and a passenger's view.

SUMMARY

An aspect of the present disclosure provides a wiper control system and method for preventing a wiper provided on a vehicle from being positioned in the middle of a windshield glass after operation.

According to an aspect of the present disclosure, a wiper control system includes: a multifunction switch detecting and transmitting an operation of a wiper provided on a vehicle; a body control module controlling a wiper relay through a data signal of the multifunction switch; and a wiper motor connected to the multifunction switch and the body control module and connected to the wiper to rotate the wiper according to rotation of a cam plate of the multifunction switch and detect a parking end of the body control module.

The wiper motor may be connected to an ignition of the multifunction switch when the cam plate is rotated.

A rotation angle of the cam plate may be set to about 30 degrees.

According to another aspect of the present disclosure, a wiper control method includes steps of: checking that a wiper provided on a vehicle is stopped at a bottom of a windshield glass and a multifunction switch is off; determining whether the multifunction switch is turned on; turning a wiper relay on when the multifunction switch is turned on; detecting a stop position of the wiper through a wiper motor before turning the wiper relay off; determining the position of the wiper; and turning the wiper relay off when the wiper is positioned at the bottom of the windshield glass.

The operation of the multifunction switch in the second step may include spraying mist or washer fluid.

The mist may be sprayed for 0.7 seconds and the washer fluid may be sprayed for 0.7 to 3.2 seconds, when the wiper relay is turned on in the third step.

The step of determining the position of the wiper may include: determining whether the wiper is positioned in the middle of the windshield glass; and determining whether the wiper is stopped in a position out of the bottom of the windshield glass.

The step of determining the position of the wiper may further include adding 0.7 seconds to an on-time of the wiper relay when the position of the wiper in the fifth step is out of the bottom of the windshield glass.

The wiper control method may include adding 0.7 seconds to the on-time of the wiper relay when the wiper is positioned in the middle of the windshield glass, and returning to detecting the position of the wiper.

The wiper control method may include adding 0.7 seconds to the on-time of the wiper relay when the wiper is stopped in the position out of the bottom of the windshield glass, and returning to detecting the position of the wiper.

A non-transitory computer readable medium containing program instructions executed by a processor can include: program instructions that check that a wiper provided on a vehicle is stopped at a bottom of a windshield glass and a multifunction switch is off; program instructions that determine whether the multifunction switch is turned on; program instructions that turn a wiper relay on when the multifunction switch is turned on; program instructions that detect a stop position of the wiper before turning the wiper relay off; program instructions that determine the position of the wiper; and program instructions that turn the wiper relay off when the wiper is positioned at the bottom of the windshield glass.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Figure 1:
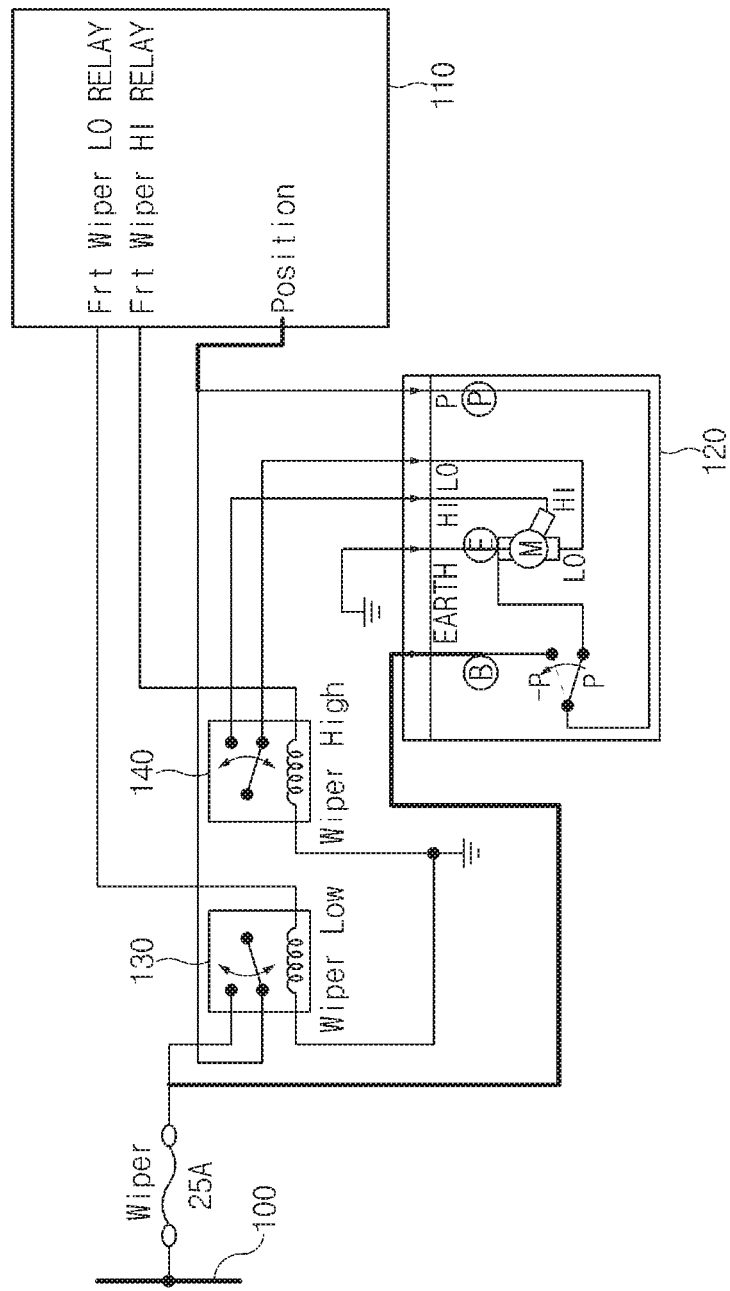
FIG. 1 is a schematic diagram of the configuration of a wiper control system according to an exemplary embodiment of the present disclosure.

As illustrated in FIG. 1, a wiper control system, according to an exemplary embodiment of the present disclosure, includes a multifunction switch 100 detecting the operation of a wiper, a body control module 110 controlling wiper relays 130 and 140, and a wiper motor 120 rotating the wiper. The wiper relays 130 and 140 include a wiper low relay 130 and a wiper high relay 140.

The multifunction switch 100 may detect and transmit an operation of the wiper, e.g., as determined by a driver of a vehicle.

The body control module 110 may control the wiper relays 130 and 140 through a data signal of the multifunction switch 100 generated by the operation.

The wiper motor 120 may be connected to the multifunction switch 100 and the body control module 110 and also be connected to the wiper. Thus, the wiper motor 120 may rotate the wiper according to rotation of a cam plate 101 of the multifunction switch 100 and detect a parking end (P-end) of the body control module 110.

In addition, the wiper motor 120 may be connected to an ignition of the multifunction switch 100 when the cam plate 101 is rotated.

Here, a rotation angle of the cam plate 101 may be set to about 30 degrees.

In other words, the present inventive concept makes up for the disadvantages of a conventional automatic-stop mechanism by combining the automatic-stop mechanism with a P-end control mechanism, thereby solving the inconvenience of the conventional wiper system and improving system reliability.

Figure 2:
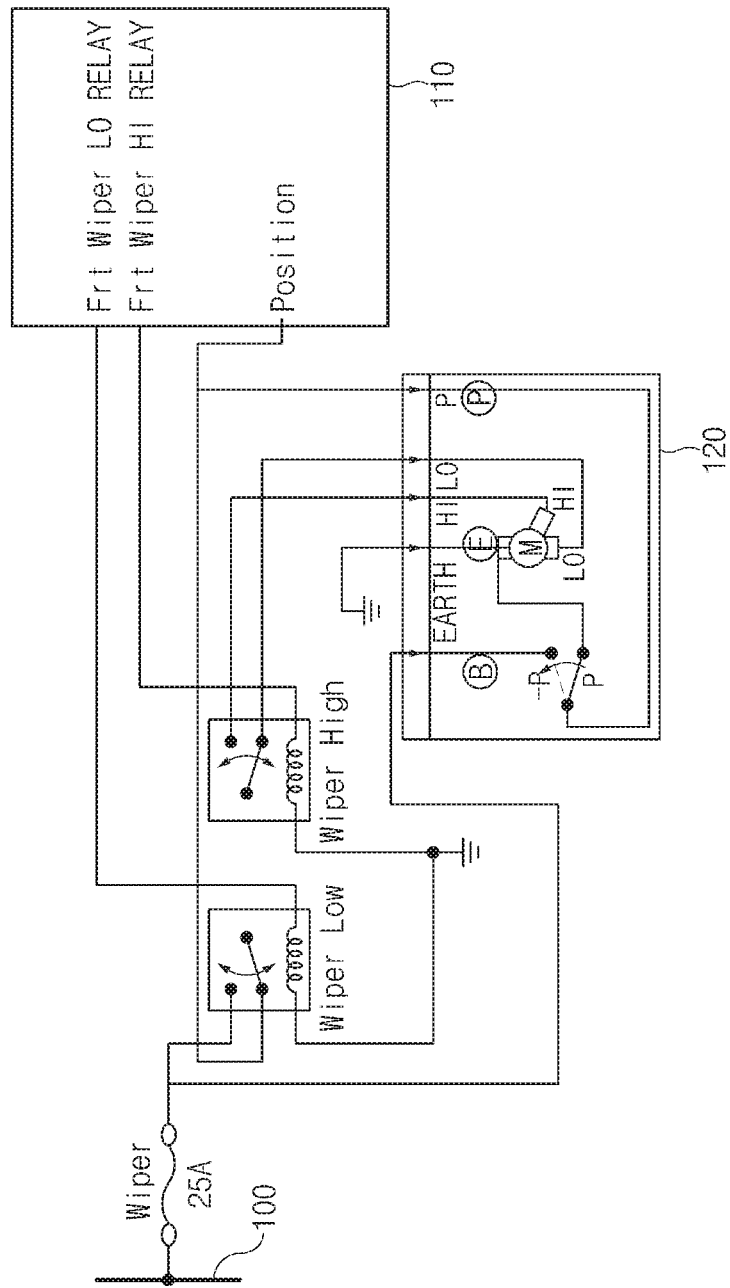
FIG. 2 (RELATED ART) is a schematic diagram of the configuration of a wiper control system according to the related art.
Figure 3:
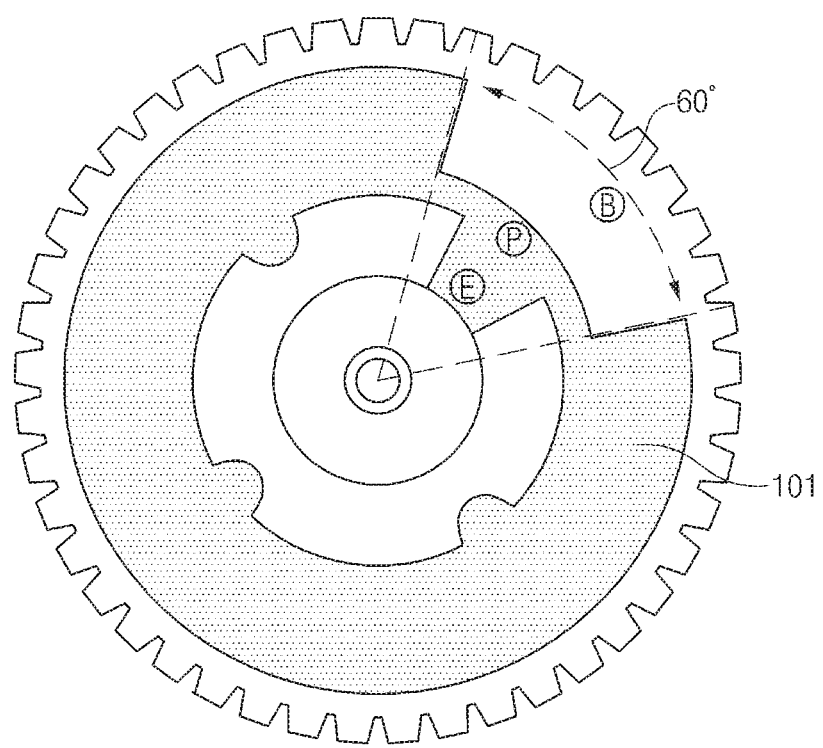
FIG. 3 (RELATED ART) illustrates the rotation of a cam plate of a body control module in a wiper control system according to the related art.

However, conventionally, as illustrated in FIGS. 2 and 3 (RELATED ART), while the motor 120 is rotated, contact points B and P contact through the cam plate 101, and the motor 120 may supply power to the wiper even in low relay and high relay off states until the contact points P and B are separated from each other, and thus, the wiper may be intermittently stopped during the spraying of mist and washer fluid.

This is caused by time control of the wiper relays 130 and 140 by the body control module 110, and a single rotation of the wiper takes approximately 1.4 seconds. When the driver, e.g., turns off the switch after a mist spraying section is provided for approximately 0.5 to 0.9 seconds, the body control module 110 turns off the wiper relays 130 and 140 in a 60 degree section as illustrated in FIG. 3, and thus, a wiper blade is stopped in a wiping area (in the middle of the windshield glass) rather than being parked in the correct position at the bottom of the windshield glass.

In addition, the operation of the wiper interlocked with the spraying of the washer fluid may also cause the inconvenience of blocking the view of the driver and/or passenger whenever the wiper is stopped, depending on the driver's habit of operating the washer fluid system. In order to prevent the wiper from being out of the correct position, even when the rotation angle of the cam plate 101 is changed to 10 degree, intermittent deviation still occurs. Moreover, a P-end determination time (frequency) of the body control module is reduced from 30 ms (10 ms*three times) to 20 ms (10 ms*two times), resulting in deteriorating reliability of signal determination.

In order to solve such a problem, the present inventive concept makes up for the disadvantages of the conventional automatic-stop mechanism by combining the automatic-stop mechanism with the P-end control mechanism, thereby preventing the wiper from being stopped in the middle of the windshield glass. To this end, the following may be performed: rotating the cam plate 101 by about 30 degrees; connecting the wiper to the ignition of the multifunction switch 100; detecting the P-end of the body control module 110; and transmitting, by the body control module 110, a P-end signal to an engine control unit (ECU) through controller area network (CAN) communications.

Figure 4:
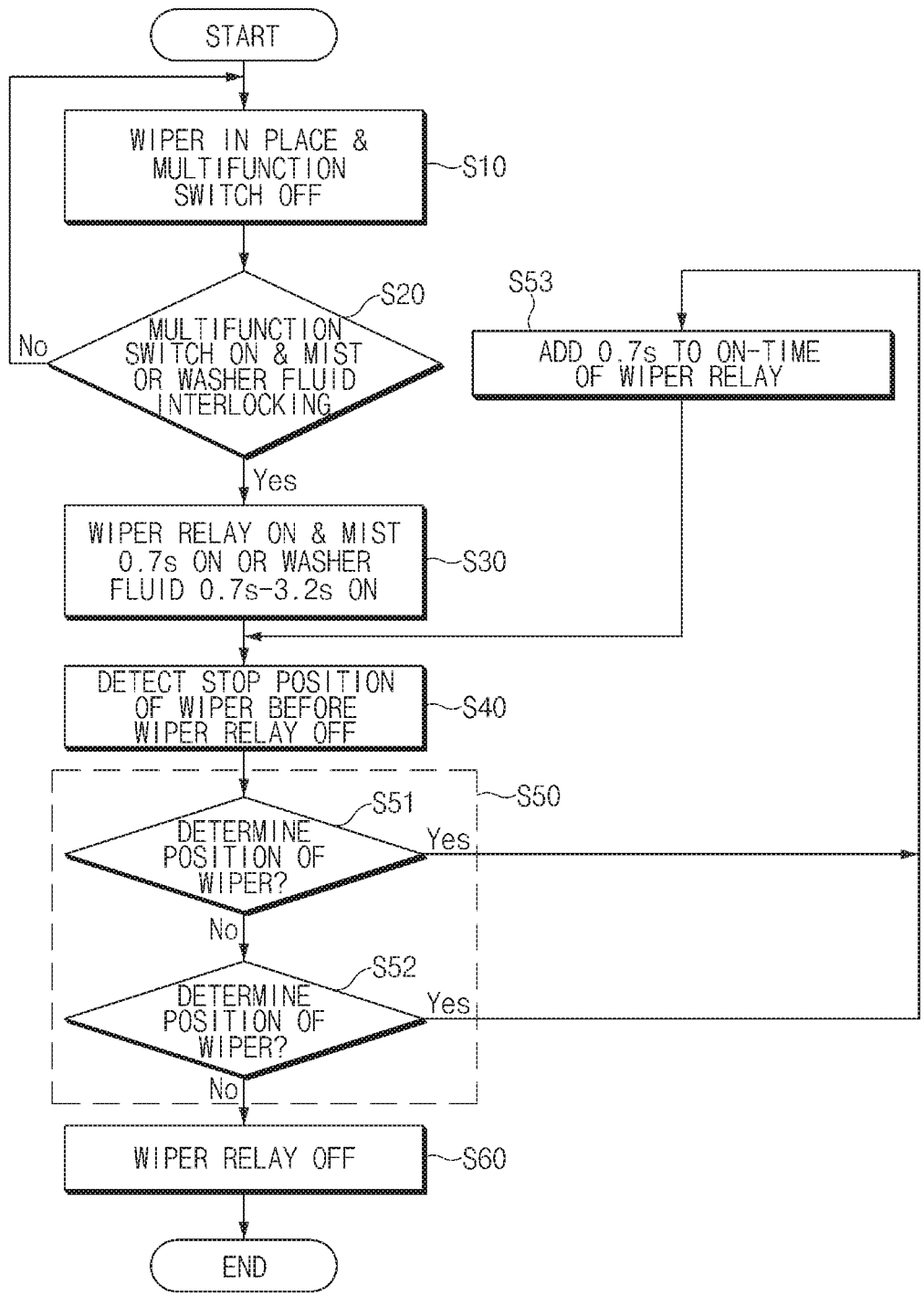
FIG. 4 is a flowchart of a wiper control method according to an exemplary embodiment of the present disclosure.

As illustrated in FIG. 4, a wiper control method, according to an exemplary embodiment of the present disclosure, includes a first step S10 of checking that the wiper is in place and the multifunction switch 100 is off; a second step S20 of determining whether the multifunction switch 100 is turned on; a third step S30 of turning the wiper relay on; a fourth step S40 of detecting a stop position of the wiper; a fifth step S50 of determining the position of the wiper; and a sixth step S60 of turning the wiper relay off. The above steps can be carried out by a controller incorporating a processor for carrying out the respective functions, where the controller may embodied in a non-transitory computer readable medium.

In the first step S10, the following may be checked: the wiper provided on a vehicle is stopped at the bottom of the windshield glass and the multifunction switch 100 is off.

Figure 5:
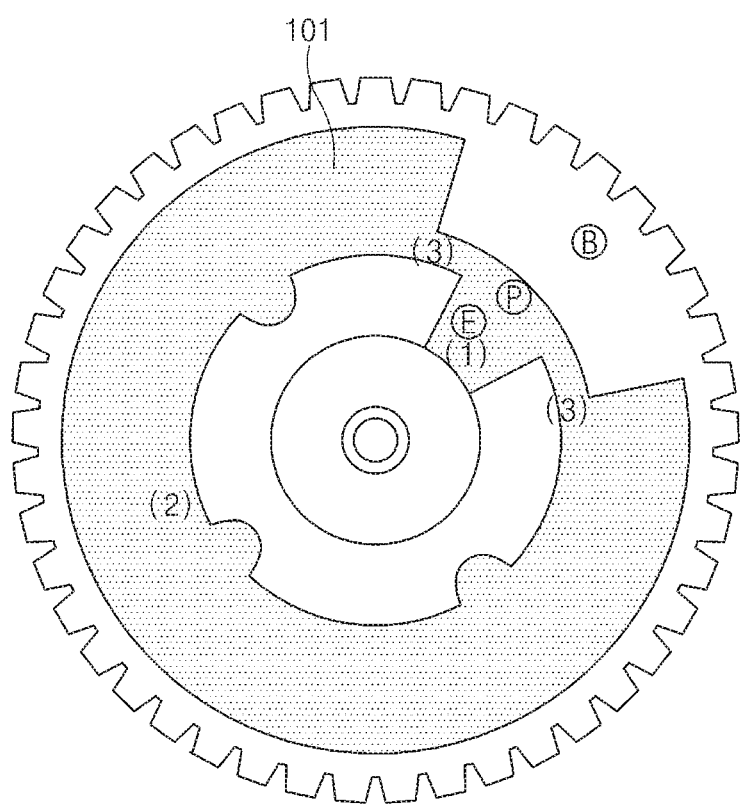
FIG. 5 illustrates positions of a wiper according to rotation of a cam plate of a body control module in a wiper control method according to an exemplary embodiment of the present disclosure.

Here, the position of the wiper is indicated by (1) of FIG. 5. Specifically, contact points P and E are in a contact state, and the wiper is stopped in the correct position.

In the second step S20, it may be determined whether the multifunction switch 100 is turned on, e.g., by a driver's operation.

Here, the operation of the multifunction switch 100 in the second step S20 may be characterized by spraying mist or washer fluid.

In the third step S30, the wiper low relay 130 may be turned on when the multifunction switch 100 is operated in the second step S20.

Here, when the wiper low relay 130 is turned on in the third step S30, the mist may be sprayed for 0.7 seconds and the washer fluid may be sprayed for 0.7 to 3.2 seconds.

In the fourth step S40, the stop position of the wiper may be detected through the wiper motor 120 before turning the wiper low relay 130 off.

In the fifth step S50, the position of the wiper may be determined.

Here, the fifth step S50 includes a first substep S51 of determining whether the wiper is stopped in the middle of the windshield glass, and a second substep S52 of determining whether the wiper is stopped in a position out of the bottom of the windshield glass.

The position of the wiper in the first substep S51 of the fifth step is indicated by (2) of FIG. 5. Specifically, contact points B and P are in a contact state, and the wiper is stopped in the middle of the windshield glass. The position of the wiper in the second substep S52 of the fifth step is indicated by (3) of FIG. 5. Specifically, contact point P is in a non-contact state with respect to contact points B and E, and the wiper is stopped in the position out of the bottom of the windshield glass.

Meanwhile, when the wiper is stopped in the middle of the windshield glass or in the position out of the bottom of the windshield glass, the fifth step S50 further includes a third substep S53 of adding 0.7 seconds to the on-time of the wiper low relay 130.

Here, when it is determined that the wiper is positioned in the middle of the windshield glass in the first substep S51 of the fifth step, the third substep S53 of the fifth step may be performed to add 0.7 seconds to the on-time of the wiper low relay 130. Thereafter, returning to the fourth step S40, the position of the wiper may be detected.

In addition, when it is determined that the wiper is not positioned in the middle of the windshield glass in the first substep S51 of the fifth step, but the wiper is stopped in the position out of the bottom of the windshield glass in the second substep S52 of the fifth step, the third substep S53 of the fifth step may be performed to add 0.7 seconds to the on-time of the wiper low relay 130. Thereafter, returning to the fourth step S40, the position of the wiper may be detected.

In the sixth step S60, the wiper low relay 130 may be turned off when the wiper is positioned at the bottom of the windshield glass after the fifth step S50.

As set forth above, the present inventive concept includes the multifunction switch 100 detecting and transmitting the operation of the wiper provided on the vehicle, the body control module 110 controlling the wiper relays 130 and 140 through the data signal of the multifunction switch 100, and the wiper motor 120 connected to the multifunction switch 100 and the body control module 110 and connected to the wiper to rotate the wiper according to rotation of the cam plate 101 of the multifunction switch 100 and detect the parking end (P-end) of the body control module 110, thereby preventing the wiper from being positioned in the middle of the windshield glass after operation to avoid inconvenience to a driver and/or passenger and improve functionality and marketability, solving the wiper operating problem without additional circuits or components to achieve cost reduction, and solving abnormal stop of the conventional wiper through the addition of logic and being easily applied to other types of vehicles to improve applicability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wiper control system, comprising:
   a multifunction switch detecting and transmitting an operation of a wiper provided on a vehicle;
   a body control module controlling a wiper relay through a data signal of the multifunction switch; and
   a wiper motor connected to the multifunction switch and the body control module and connected to the wiper to rotate the wiper according to rotation of a cam plate of the multifunction switch and detect a parking end of the body control module,
   wherein the body control module determines whether the wiper is positioned in a middle of a windshield glass of the vehicle or the wiper is stopped in a position out of a bottom of the windshield glass.

2. The wiper control system according to claim 1, wherein the wiper motor is connected to an ignition of the multifunction switch when the cam plate is rotated.

3. The wiper control system according to claim 1, wherein a rotation angle of the cam plate is set to about 30 degrees.

4. A wiper control method, comprising the steps of:
   checking, by a controller, that a wiper provided on a vehicle is stopped at a bottom of a windshield glass and a multifunction switch is off;
   determining, by the controller, whether the multifunction switch is turned on;
   turning a wiper relay on, by the controller, when the multifunction switch is turned on;
   detecting, by a wiper motor, a stop position of the wiper before turning the wiper relay off;
   determining, by the controller, whether the wiper is positioned in a middle of the windshield glass of the vehicle or the wiper is stopped in a position out of the bottom of the windshield glass; and turning the wiper relay off, by the controller, when the wiper is positioned at the bottom of the windshield glass.

5. The wiper control method according to claim 4, wherein determining whether the multifunction switch is turned on comprises spraying mist or washer fluid.

6. The wiper control method according to claim 5, wherein the mist is sprayed for 0.7 seconds and the washer fluid is sprayed for 0.7 to 3.2 seconds, when the wiper relay is turned on.

7. The wiper control method according to claim 4, wherein the step of determining the position of the wiper further comprises: adding 0.7 seconds to an on-time of the wiper relay when the position of the wiper is out of the bottom of the windshield glass.

8. The wiper control method according to claim 7, further comprising: adding 0.7 seconds to the on-time of the wiper relay when the wiper is positioned in the middle of the windshield glass, and returning to detecting the position of the wiper.

9. The wiper control method according to claim 7, further comprising: adding 0.7 seconds to the on-time of the wiper relay when the wiper is stopped in the position out of the bottom of the windshield glass, and returning to detecting the position of the wiper.

10. A non-transitory computer readable medium containing program instructions executed by a processor, the computer readable medium comprising:
   program instructions that check that a wiper provided on a vehicle is stopped at a bottom of a windshield glass and a multifunction switch is off;
   program instructions that determine whether the multifunction switch is turned on;
   program instructions that turn a wiper relay on when the multifunction switch is turned on;
   program instructions that detect a stop position of the wiper before turning the wiper relay off;
   program instructions that determine whether the wiper is positioned in a middle of the windshield glass of the vehicle or the wiper is stopped in a position out of the bottom of the windshield glass; and
   program instructions that turn the wiper relay off when the wiper is positioned at the bottom of the windshield glass.

* * * * *